United States Statutory Invention Registration [19]

[11] Reg. Number: H382

Keown et al. [43] Published: Dec. 1, 1987

[54] LONG ROD PENETRATOR

[75] Inventors: William P. Keown, West Milford, N.J.; Peter N. Jones, Seven Oaks, England

[73] Assignee: The United States of America as represented by the Secretary of the Army, Washington, D.C.

[21] Appl. No.: 24,098

[22] Filed: Mar. 2, 1987

[51] Int. Cl.[4] ..... F42B 11/14

[52] U.S. Cl. ..... 102/517; 102/511

*Primary Examiner*—Harold J. Tudor

*Attorney, Agent, or Firm*—Anthony T. Lane; Harold H. Card, Jr.; Michael C. Sachs

[57] ABSTRACT

An improved penetrator rod for a kinetic energy projectile is disclosed. Embedded as a central core within said penetrator rod is a lubricating rod, comprising metal alloys such as tin zinc, aluminum, or lead, which will continue to follow as it erodes upon penetration despite the heat and pressures of impact to an armor target. A new, lubricating, front end surface constantly re-appears as the front end of the penetrator erodes upon impact.

5 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LONG ROD PENETRATOR

GOVERNMENTAL INTEREST

The invention described herein may be made, used, or licensed by or for the Government for governmental purposes, without the payment to us of any royalties thereon.

BACKGROUND AND FIELD OF THE INVENTION

This invention relates to the field of kinetic energy projectiles in general, and to improved long rod penetrators therefor. In particular, this invention relates to the difficult problem of lubricating a penetrator rod so it will remain lubricated throughout use, to enhance penetration into the target (armor).

Since the fourteenth century it has been known that lubricants can improve the armor penetration capability of arrows, shot and shell. In the Middle Ages this was done by capping arrowheads with bees wax; in our own time by polytetrafloride ethylene coating small arms bullets and tipping medium caliber armor piercing shot with zirconium, aluminum, and magnesium. In each case, the velocity required to penetrate a given target is reduced.

The application of lubricants to shot with higher length to diameter ratios, L/D, so that the lubricants remain thereon for effectiveness is more problematic for two reasons. Firstly, when a long rod penetrates a very thick single plate the exterior surface of the shot plays little or no part in the actual penetration zone. This is because the penetration takes place by erosion of the front surface, hydrodynamic penetration, and the shot surface flows backward never making contact with the armor. Secondly, when a long rod penetrates a multilayer array of steel plates any externally applied lubricant will be wiped off by the first plate.

BRIEF SUMMARY OF THE INVENTION

This invention solves these problems by placing the lubricant metal in the form of a rod in the center of the projectile. Thus, in all cases of penetration by this method, fresh lubricant is constantly exposed as the target degrades the penetrator tip.

It can be seen that with this arrangement, when the shot penetrates thick plates, the lubricant is introduced in the eroding zone reducing loads and energy losses due to extreme mechanical heating. When the shot penetrates multiplate arrays, fresh lubricant is available on each passage through a plate, and acts in a manner similar to the cases sited in the introduction (i.e.) reduces required penetration velocity.

OBJECTS OF THE INVENTION

Accordingly, it is an object of this invention to provide kinetic energy projectile, long rod cores, of increased armor penetrability.

Another object of this invention is to provide a kinetic energy penetrator capable of continuous lubrication as it penetrates through armor plating whether arranged as thick plates, or even as multiplate arrays.

Further objects and advantages will become obvious from a reading of the attached specification and viewing of its drawings, in which:

LIST OF FIGURES

FIG. 1 shows a long rod penetrator having a lubricant core center embedded therein.

DETAILED DESCRIPTION OF THE INVENTION

Figure 1:
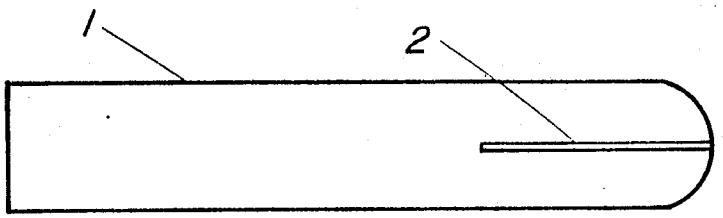

In FIG. 1, a long rod penetrator (1) is shown having an embedded rod (2) which is intended for the said lubrication. A material for lubrication is chosen which will have the property that it will not break down and lose its desirable viscous flow properties in the heat and pressures of impact and penetration. Ordinary organic lubricants are not suitable for this purpose. Effective metal type lubricants, instead, include: tin, zinc, aluminum, and lead alloys, although other suitable materials can be substituted therefor so long as they have the above mentioned properties.

An advantage of the lubricant rod arrangement is that the effect on projectile mass i.e. replacing part of the rod with a small lubricant rod, will be small, less than 0.02%. The loss of mass available is insignificant, and since the lubricant rod is located along the neutral axis, no degredation of performance of the shot against inclined targets will be experienced.

What is claimed is:

1. A penetrator for a kinetic energy projectile comprising a penetrator rod, having embedded therein, as a central core rod within said penetrator rod, a lubricator rod for providing lubrication to the penetrator as it impacts and penetrates a target.

2. The penetrator of claim 1 wherein said lubricator rod comprises tin.

3. The penetrator of claim 1 wherein said lubricator rod comprises zinc.

4. The penetrator of claim 1 wherein said lubricator rod comprises aluminum.

5. The penetrator of claim 1 wherein said lubricator rod comprises lead.

* * * * *